United States Patent
Shioda et al.

(10) Patent No.: US 8,182,341 B2
(45) Date of Patent: May 22, 2012

(54) CHARACTER CONTROL DEVICE, CHARACTER CONTROL METHOD, RECORDING MEDIUM, AND PROGRAM

(75) Inventors: Kenichiro Shioda, Tokyo (JP); Akihiro Nakagawa, Aichi-ken (JP); Naoyuki Shiraishi, Yotsukaido (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1021 days.

(21) Appl. No.: 11/909,919

(22) PCT Filed: Mar. 23, 2006

(86) PCT No.: PCT/JP2006/305808
§ 371 (c)(1),
(2), (4) Date: Sep. 27, 2007

(87) PCT Pub. No.: WO2006/109487
PCT Pub. Date: Oct. 19, 2006

(65) Prior Publication Data
US 2009/0069086 A1 Mar. 12, 2009

(30) Foreign Application Priority Data
Mar. 30, 2005 (JP) ................................. 2005-097512

(51) Int. Cl.
*A63F 9/24* (2006.01)

(52) U.S. Cl. ........................................... 463/36; 463/43

(58) Field of Classification Search .................... 463/36, 463/43
See application file for complete search history.

(56) References Cited

U.S. PATENT DOCUMENTS 6,454,653 B1 * 9/2002 Kawazu ........................... 463/43

FOREIGN PATENT DOCUMENTS

| EP | 1 040 855 A2 | 10/2000 |
| EP | 1 302 226 A2 | 4/2003 |
| JP | 08-063613 A | 3/1996 |
| JP | 2000-308755 A | 11/2000 |
| JP | 2001-056870 A | 2/2001 |
| JP | 2002-052249 A | 2/2002 |
| JP | 2002-066131 A | 3/2002 |
| JP | 2002-074396 A | 3/2002 |
| JP | 2002-143555 A | 5/2002 |
| WO | WO 2004/001536 A2 | 12/2003 |

OTHER PUBLICATIONS

Supplementary Search Report from the European Patent Office for Application 06729775.4, PCT/JP2006305808, dated Jun. 3, 2008, 5 pages total.
International Search Report and Written Opinion PCT/JP2006/305808 dated Apr. 18, 2006, 5 pages.

* cited by examiner

*Primary Examiner* — Dmitry Suhol
*Assistant Examiner* — Malina K Rustemeyer
(74) *Attorney, Agent, or Firm* — Howard & Howard Attorneys PLLC

(57) ABSTRACT

A formation information storage unit (240) stores formation information regulating a formation which characters should form. A character control unit (250) turns off assessment of contact between allies when the characters are to formate and, based on formation information, assembles the respective characters in respective positions. Then, after the characters are assembled, the character control unit (250) turns contact assessment back on. Further, when the characters are to attack, the character control unit (250) moves front row characters toward enemy characters and makes back row characters follow the front row characters, while maintaining a certain amount of space therebetween. Then, when a front row character is destroyed, a back row character replaces the destroyed character.

6 Claims, 7 Drawing Sheets

CHARACTER STATUS TABLE

| CHARACTER ID | POSITION COORDINATES | BOUNDING BOX | HP VALUE | ... |
|---|---|---|---|---|
| ALLY CHARACTERS | | | | |
| M001 | (x1, y1, z1) | (xa−xb, ya−yb, za−zb) | 200 | ... |
| M002 | (x2, y2, z2) | (xa−xb, ya−yb, za−zb) | 130 | ... |
| M003 | (x3, y3, z3) | (xa−xc, ya−yb, za−zb) | 110 | ... |
| M004 | (x4, y4, z4) | (xa−xc, ya−yb, za−zc) | 190 | ... |
| ... | ... | ... | ... | ... |
| ENEMY CHARACTERS | | | | |
| T001 | (x5, y5, z5) | (xa−xc, ya−yb, za−zc) | 180 | ... |
| T002 | (x6, y6, z6) | (xa−xc, ya−yb, za−zb) | 100 | ... |
| T003 | (x7, y7, z7) | (xa−xb, ya−yb, za−zb) | 210 | ... |
| T004 | (x8, y8, z8) | (xa−xb, ya−yb, za−zb) | 30 | ... |
| ... | ... | ... | ... | ... |

FIG. 5

CHARACTER CONTROL DEVICE, CHARACTER CONTROL METHOD, RECORDING MEDIUM, AND PROGRAM

TECHNICAL FIELD

The present invention relates to a character control device, character control method, recording medium and program suitable for moving a character group in an orderly fashion.

BACKGROUND ART

Conventionally, various games (software or the like) which are executed by a video game device, etc., have been developed. Of the games, games generally called action games are incorrigibly popular and supported by players of a wide range of age groups.

In such an action game, in a case of a combat game, for example, the player appropriately operates his or her character arranged in a virtual world, moving the character while avoiding obstacles, etc. Then, there is a game type in which the character fights with encountered enemy character groups, breaks from these groups, and achieves an objective.

As an example of a technique applied to such an action game, there has been proposed a technique of a video game device that enables the wait time associated with the reading of an external storage device to be suppressed (see Patent Literature 1, for example).

Patent Literature 1: Unexamined Japanese Patent Application KOKAI Publication No. 2000-308755 (pp. 3-5, FIG. 2)

DISCLOSURE OF INVENTION

Problem to be Solved by the Invention

In the above-described action game (combat game), the player generally operates a single character. Recently, however, action games in which groups fight each other are also in continual development.

In such an action game in which groups fight each other, each character is independently controlled, resulting in virtually no cohesiveness and, at present, a state that is far from an actual simulation of a battle between groups.

As a result, for example, the ability to form a coherent group and take action in a somewhat orderly fashion has been desired.

Nevertheless, when a cohesive group was actually formed, quick movement was not always possible due to contact between characters, etc., resulting in the need for further improvement.

Further, the problem arose that, once a cohesive group was formed, the group would unravel during subsequent action (for example, during a movement, attack, etc.), making it impossible to take action with cohesiveness maintained.

The present invention has been made to overcome such problems, and it is an object of the present invention to provide a program, character control method and character control device capable of moving a character group in an orderly fashion.

Means for Solving the Problem

A character control device according to a first aspect of the present invention includes a character storage unit, a formation storage unit, an assembling control unit, and an action control unit, which are configured as follows.

First, the character storage unit stores information of a plurality of characters arranged in a virtual space. Further, the formation storage unit stores formation information regulating the formation which the characters should form. The assembling control unit, based on the formation information, assembles the respective characters in respective positions within the formation, which are assigned on a per character basis, while permitting contact between characters. Then, the action control unit controls the respective actions of the respective characters assembled in formation based on attributes determined according to position within the formation while maintaining, under predetermined conditions, the relative positional relationship that forms the formation.

When the respective characters are assembled in respective positions within the formation in this way, contact detection between ally characters is turned off, for example, and each character is moved. This makes it possible for the respective characters to quickly get into formation. Further, after the formation has been formed, attacks against enemy characters are controlled based on attributes determined according to front row and back row positions, for example, while maintaining the relative positional relationship of the respective characters under predetermined conditions. As a result, the character group can be moved in an orderly fashion.

A character control device according to a second aspect of the present invention includes a character storage unit, a formation storage unit, an assembling control unit, and an action control unit, which are configured as follows.

First, the character storage unit stores information of a plurality of characters arranged in a virtual space that are classified into enemies and allies. Further, the formation storage unit stores formation information regulating at least the formation which the ally characters should form. The assembling control unit, based on the formation information, assembles the respective ally characters in respective positions within the formation, which are assigned on a per ally character basis, while permitting contact between ally characters. Then, the action control unit controls the respective actions of the respective ally characters assembled in formation based on attributes determined according to position within the formation while maintaining, under predetermined conditions, the relative positional relationship that forms the formation.

When the respective characters are assembled in respective positions within the formation in this way, contact detection between ally characters is turned off, for example, and each character is moved. This makes it possible for the respective characters to quickly get into formation. Further, after the formation has been formed, attacks against enemy characters are controlled based on attributes determined according to front row and back row positions, for example, while maintaining the relative positional relationship of the respective characters under predetermined conditions. As a result, the character group can be moved in an orderly fashion.

The above-described character control device may further comprise a contact assessment unit that assesses contact between characters by comparing the respective occupied areas specified for each character, and a minute moving unit that minutely moves the positions of the characters for which the contact has been identified, wherein: the assembling control unit assembles the respective characters in a state where the respective values of the respective occupied areas have changed to values less than standard; and the action control unit controls the actions of the respective characters in a state where the values of the respective occupied areas have returned to standard.

The formation storage unit may store attribute information corresponding to a plurality of rows within the formation, and link information that regulates the positional relationship within the formation; and the action control unit may control the movement of the respective characters in the front row of the formation based on the attribute information, and force the respective characters of the back row of the formation to follow the corresponding characters of the front row while maintaining a certain amount of space therebetween based on the link information.

The above-described character control device may further comprise a formation information updating unit that updates the formation information and assigns to another character a position within the formation of a destroyed character in a case where a character constituting the formation has been destroyed based on predetermined conditions.

A character control method according to a third aspect of the present invention employs a character storage unit (that stores information of a plurality of characters arranged in a virtual space) and a formation storage unit (that stores formation information regulating the formation which the characters should form), and includes an assembling control step and an action control step, which are configured as follows.

First, in the assembling control step, the respective characters are assembled in respective positions within the formation, which are assigned on a per character basis, based on the formation information while permitting contact between characters. Then, in the action control step, the respective actions of the respective characters assembled in formation are controlled based on attributes determined according to position within the formation while maintaining, under predetermined conditions, the relative positional relationship that forms the formation.

When the respective characters are assembled in respective positions within the formation in this way, contact detection between ally characters is turned off, for example, and each character is moved. This makes it possible for the respective characters to quickly get into formation. Further, after the formation has been formed, attacks against enemy characters are controlled based on attributes determined according to front row and back row positions, for example, while maintaining the relative positional relationship of the respective characters under predetermined conditions. As a result, the character group can be moved in an orderly fashion.

A program according to the fourth aspect of the invention is configured to control a computer (including a game device) to function as the above-described character control device.

This program can be recorded in a computer readable information recording medium (recording medium), such as a compact disk, a flexible disk, a hard disk, a magneto-optical disk, a digital video disk, a magnetic tape or a semiconductor memory.

The program can be distributed and sold, independently of a computer which executes the program, over a computer communication network. The information recording medium can be distributed and sold, independently of the computer.

Effect of the Invention

According to the present invention, it is possible to move a character group in an orderly fashion.

BRIEF DESCRIPTION OF DRAWINGS

[FIG. 5] An exemplary diagram showing one example of a character status table.

Figure 1:
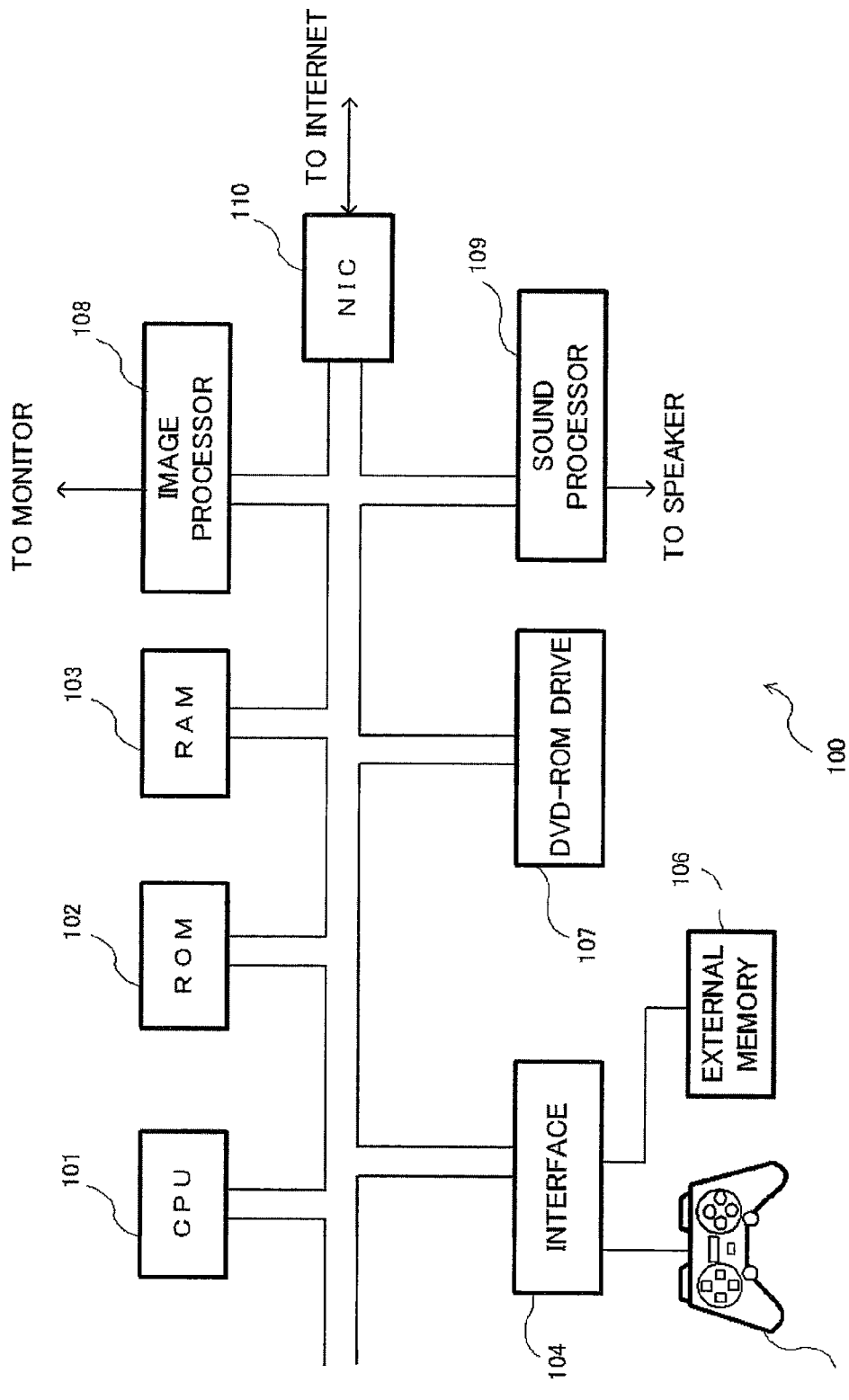
[FIG. 1] An exemplary diagram illustrating the schematic configuration of a typical game device which realizes a character control device according to an embodiment of the present invention.

DESCRIPTION OF REFERENCE NUMERALS 100 game device
101 CPU
102 ROM
103 RAM
104 interface
105 controller
106 external memory
107 DVD-ROM drive
108 image processor
109 sound processor
110 NIC
200 character control device
210 map storage unit
220 character information storage unit
230 operational input receiving unit
240 formation information storage unit
250 character control unit
251 assembling control unit
252 action control unit
260 character status management unit
270 contact assessment unit
280 image generating unit

BEST MODE FOR CARRYING OUT THE INVENTION

An embodiment of the present invention will be described below. While the following describes an embodiment in which the invention is adapted to a game device for the ease of understanding, the invention can also be adapted to information processing apparatuses, such as various computers, PDA and cellular phone. That is, the embodiment to be described below is given by way of illustration only, and does not limit the scope of the invention. Therefore, those skilled in the art can employ embodiments in which the individual elements or all the elements are replaced with equivalent ones, and which are also encompassed in the scope of the invention.

(Embodiment 1)

FIG. 1 is an exemplary diagram illustrating the schematic configuration of a typical game device which realizes a character control device according to the embodiment of the present invention. A description will be given hereinbelow referring to these diagrams.

The game device 100 has a CPU (Central Processing Unit) 101, a ROM (Read Only Memory) 102, a RAM (Random Access Memory) 103, an interface 104, a controller 105, an external memory 106, a DVD (Digital Versatile Disk)-ROM drive 107, an image processor 108, a sound processor 109, and an NIC (Network Interface Card) 110.

As a DVD-ROM storing a program and data for a game is loaded into the DVD-ROM drive 107 and the game device 100 is powered on, the program is executed to realize the character control device of the embodiment.

The CPU 101 controls the general operation of the game device 100, and is connected to individual components to exchange a control signal and data therewith.

An IPL (Initial Program Loader) which is executed immediately after power-on is recorded in the ROM 102. As the IPL is executed, the program recorded in the DVD-ROM is read into the RAM 103 and is executed by the CPU 101. The programs and various data of the operating system required for general operation control of the game device 100 are recorded in the ROM 102.

The RAM 103 is for temporarily storing data and programs, and retains the program and data read from the DVD-ROM, and other data needed for progressing a game and chat communication.

The controller 105 connected via the interface 104 accepts an operation input which is made when a user executes the game. For example, the controller 105 accepts an input, such as a string of characters (message), according to the operation input.

Data indicative of the progress status of the game, data of the log (record) of the chat communication and the like are stored in a rewritable manner in the external memory 106 connected detachably via the interface 104. As the user makes an instruction input via the controller 105, these data can adequately be recorded in the external memory 106.

The program for realizing the game and the image data and sound data accompanying the game are recorded in the DVD-ROM to be loaded into the DVD-ROM drive 107. Under the control of the CPU 101, the DVD-ROM drive 107 performs a process of reading from the DVD-ROM loaded therein to read a necessary program and data, and these are temporarily stored in the RAM 103 or the like.

The image processor 108 processes data read from the DVD-ROM by means of the CPU 101 and an image operation processor (not shown) the image processor 108 has, and then records the data in a frame memory (not shown) in the image processor 108. The image information recorded in the frame memory is converted to a video signal at a predetermined synchronous timing, which is in turn output to a monitor (not shown) connected to the image processor 108. Thereby, image displays of various types are available.

The image operation processor can enable fast execution of an overlay operation of a two-dimensional image, a transparent operation like a blending, and various kinds of saturate operations.

It is also possible to enable fast execution of an operation of rendering polygon information which is arranged in virtual three-dimensional space and to which various kinds of texture information is added, by a Z buffer scheme to acquire an rendered image with a downward view of a polygon, arranged in the virtual three-dimensional space, from a predetermined view point position.

Further, the CPU 101 and the image operation processor cooperate to be able to write a string of characters as a two-dimensional image in the frame memory or on each polygon surface according to font information which defines the shapes of characters. While the font information is recorded in the ROM 102, exclusive font information recorded in the DVD-ROM can be used as well.

The sound processor 109 converts sound data read from the DVD-ROM to an analog sound signal, and outputs the sound signal from a speaker (not shown) connected thereto. Under the control of the CPU 101, the sound processor 109 generates sound effects and music data to be generated during progress of the game, and outputs sounds corresponding thereto from a speaker.

The NIC 110 serves to connect the game device 100 to a computer communication network (not shown), such as the Internet. The NIC 110 includes an analog modem according to the 10 BASE-T/100 BASE-T standard which is used at the time of constructing a LAN (Local Area Network) or to be connected to the Internet using a telephone circuit, an ISDN (Integrated Services Digital Network) modem, an ADSL (Asymmetric Digital Subscriber Line) modem, a cable model to connect to the Internet using a cable television circuit, or the like, and an interface (not shown) which intervenes between those modems and the CPU 101.

In addition, the game device 100 may be configured so as to achieve the same functions as the ROM 102, the RAM 103, the external memory 106, and the DVD-ROM or the like which is to be loaded into the DVD-ROM drive 107 by using a large-capacity external storage device, such as a hard disk.

It is also possible to employ a mode of connecting to a keyboard for receiving an edition input of a character string from the user, a mouse or the like for receiving designation of various positions and a selective input therefrom.

An ordinary computer (general-purpose personal computer or the like) can be used as the character control device in place of the game device 100 of the embodiment. For example, the ordinary computer, like the game device 100, has a CPU, RAM, ROM, DVD-ROM drive and NIC, has an image processor having simpler functions than the game device 100, and can use a flexible disk, magneto-optical disk, a magnetic tape or the like in addition to a hard disk as an external storage device. The keyboard, mouse or the like, not a controller, is used as an input device. As the game program is executed after installation thereof, the computer serves as the character control device.

(Schematic Configuration of Character Control Device)

Figure 2:
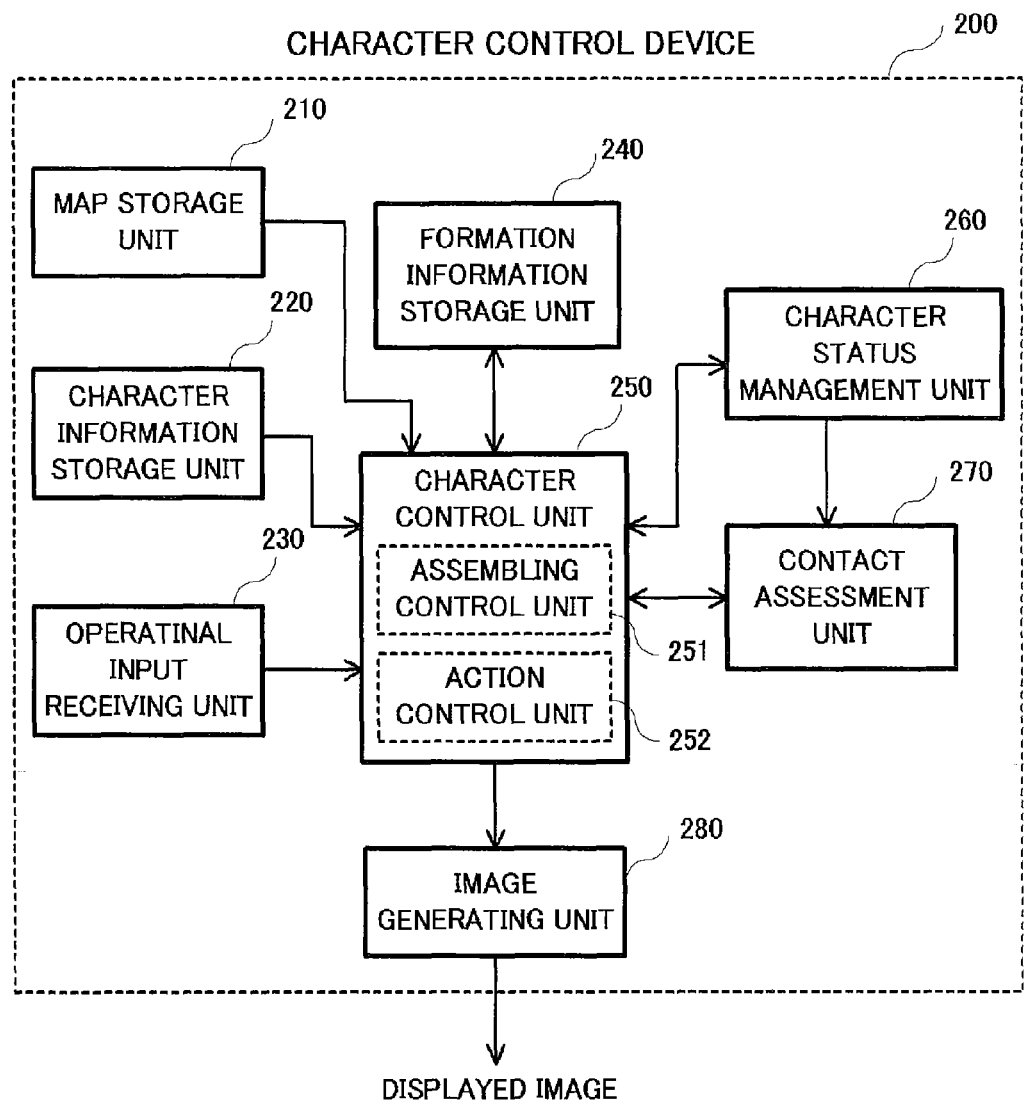
[FIG. 2] An exemplary diagram illustrating the schematic configuration of a character control device according to the embodiment of the present invention.

FIG. 2 is an exemplary diagram illustrating the schematic configuration of the character control device according to the present embodiment. A description will be given hereinbelow referring to these diagrams.

A character control device 200 comprises a map storage unit 210, a character information storage unit 220, an operational input receiving unit 230, a formation information storage unit 240, a character control unit 250, a character status management unit 260, a contact assessment unit 270, and an image generating unit 280.

The following describes a case where the character control unit 200, for example, is applied to an action game (realm vs. realm game) in which a plurality of characters (character groups) classified as allies and enemies fight each other in a virtual world. Then, the character control device 200, as described below, quickly forms a cohesive group from a scattered plurality of characters, and forces the character group into action while maintaining cohesiveness.

First, the map storage unit 210 stores the information of a map (map information) on which predetermined land forms and products, etc., are arranged in a virtual world.

The map information specifies the layout information (including images, etc.,) of landforms such as mountains, rivers, ponds, and flatlands, and structures such as bridges, villages, and castles, and also includes information regarding the areas in which characters can move.

The DVD-ROM loaded into the DVD-ROM drive 107 or the external memory 106 can function as such a map storage unit 210.

The character information storage unit 220 stores information (character information) related to a plurality of characters classified as allies and enemies.

The soldiers, such as foot soldiers or spearmen, and the character that is the commander leading these soldiers, etc., are specified along with images in the character information, for example. Further, a specified value, such as HP (hit points), etc., is also defined for each character.

The DVD-ROM loaded into the DVD-ROM drive 107 or the external memory 106 can function as such a character information storage unit 220.

The operational input receiving unit 230 receives various commands, etc., to be given to the ally characters (more specifically, to the character with commander attributes described later).

For example, the operational input receiving unit 230 receives commands such as a formate command for assembling scattered ally characters into formation at a predetermined location, a move command for moving the ally characters while maintaining formation, and an attack command for attacking enemy characters while maintaining formation. The controller 105 can function as such an operational input receiving unit 230.

The formation information storage unit 240 stores formation information regulating the formation which the ally characters should form.

Figure 3A:
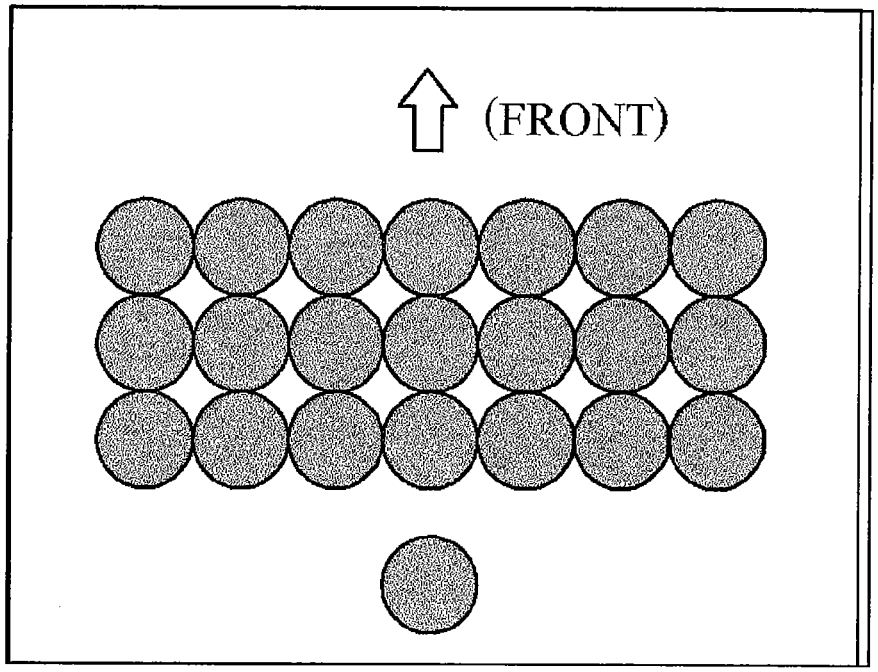
[FIG. 3A] An exemplary diagram for explaining formation information.

For example, the formation information storage unit 240 stores formation information regulating the formation of a shape such as shown in FIG. 3A. This formation, as one example, is a three-line formation, and is specified in such a manner that the commander is positioned in the rear.

The formation information includes attribute and link information.

Figure 3B:
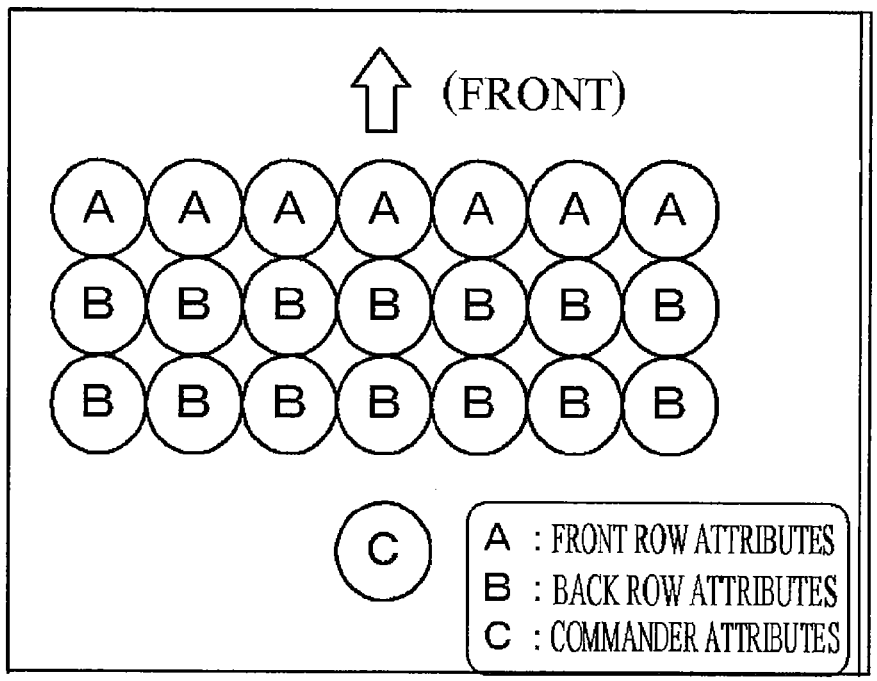
[FIG. 3B] An exemplary diagram for explaining formation information.

Specially, the attributes are specified as shown in FIG. 3B. Here, A in the figure indicates front row attributes, B indicates back row attributes, and C indicates commander attributes.

Figure 3C:
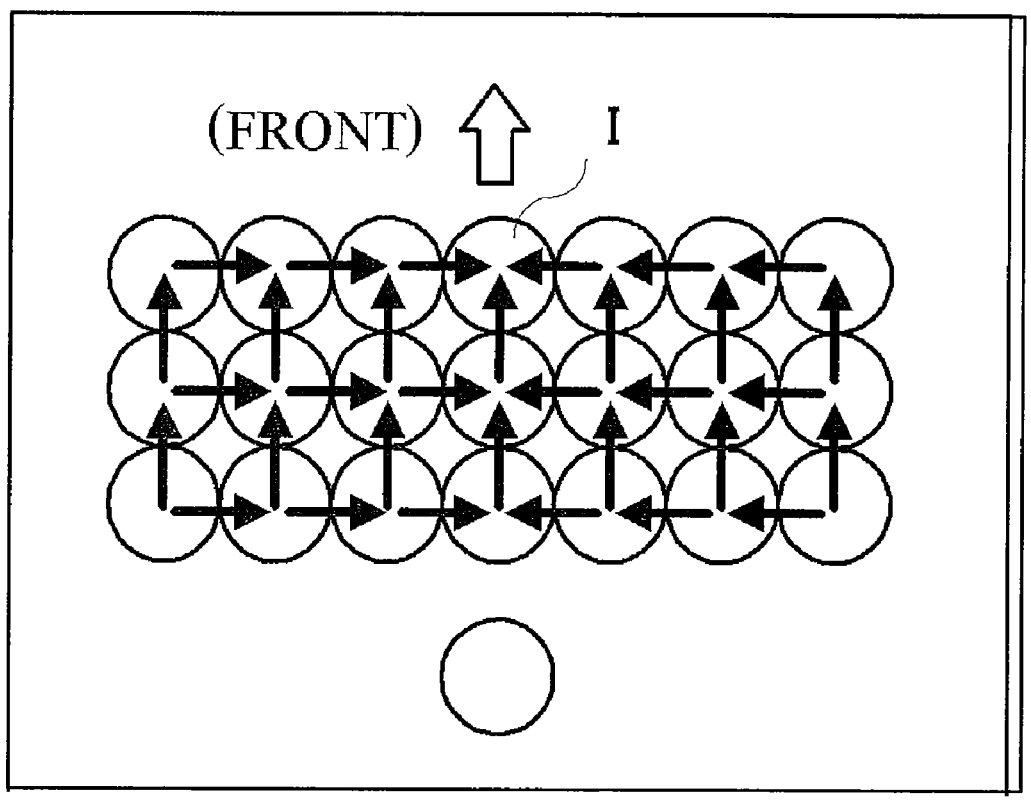
[FIG. 3C] An exemplary diagram for explaining formation information.

That is, when the characters are arranged based on this formation, these attributes are applied to each character in accordance with arranged position. Then, as described above, the action of each character is controlled according to these attributes. The link information is specified as shown in FIG. 3C. The arrows in the figure indicate the connecting relationship according to position. That is, with position I in the figure as standard, the arrows indicate a state where the other positions are connected to a position to the front, left or right.

Then, when the characters are arranged based on this formation, the relative positional relationships, etc, are determined for the respective characters with reference to this link information. That is, as described above, when enemy characters are attacked, each character is moved in an orderly fashion while referring to this link information. The RAM 103 can function as such a formation information storage unit 240.

Returning to FIG. 2, the character control unit 250 includes a assembling control unit 251 and an action control unit 252, and controls the assembling and action of ally characters.

That is, the assembling control unit 251 generates the above-described formation information when scattered characters are to be placed in formation, and assembles the respective characters into the respective positions within the formation based on this formation information. At this time, the assessment of contact between allies of contact assessment unit 270 is turned off. That is, since the so-called "body blow assessment" is not conducted when the characters are assembled into rows following the formation, the characters can move smoothly without pushing and shoving, etc., and quickly get into formation.

Once formation is completed (assembly is completed), the assembling control unit 251 turns the contact assessment of contact assessment unit 270 back on.

Figure 4A:
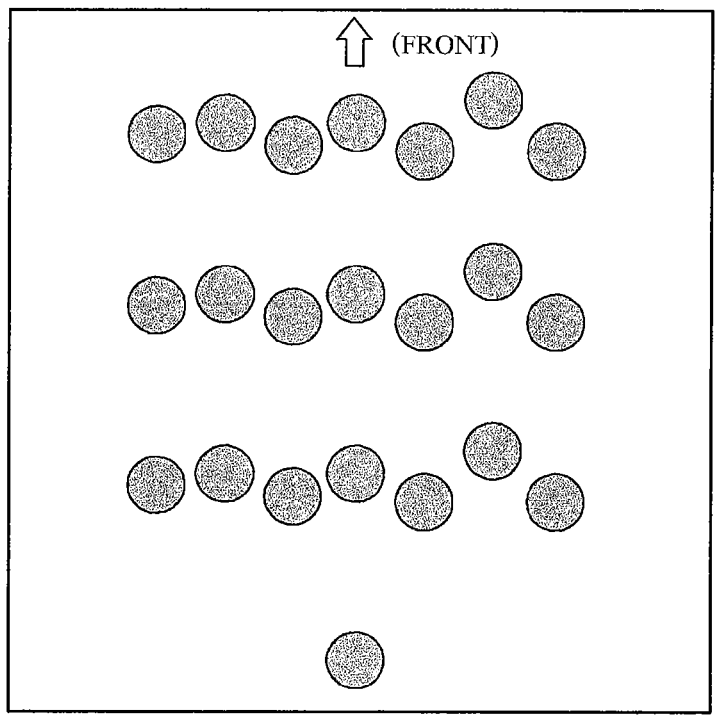
[FIG. 4A] An exemplary diagram showing one example of a formation during an attack.
Figure 4B:
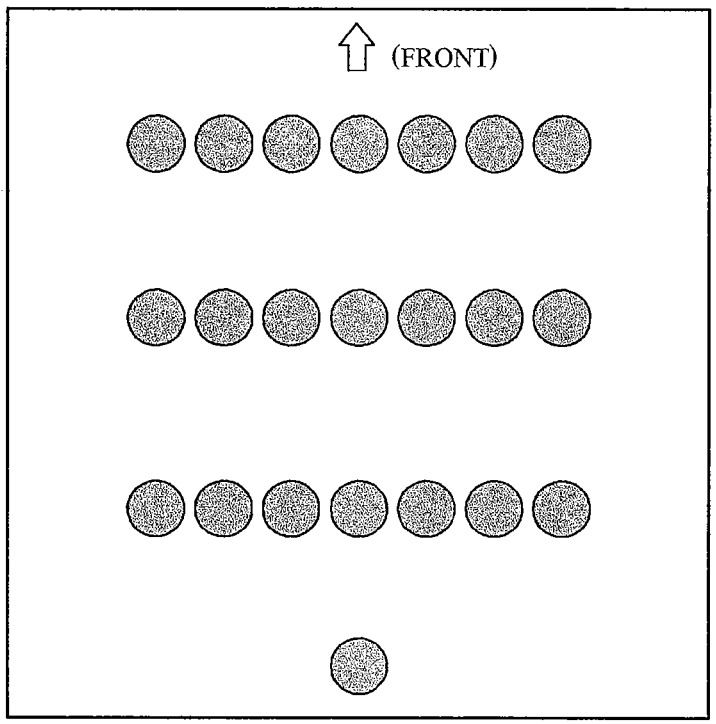
[FIG. 4B] An exemplary diagram showing one example of a formation during an attack.

The action control unit 252 controls each character based on applied properties while maintaining the relative positional relationship of each character that constitutes the formation based on the above-described link information. For example, when the enemy characters are attacked, the action control unit 252 moves the characters as shown in FIG. 4A and FIG. 4B. FIG. 4A shows a case where the characters arranged in formation are foot soldiers, and FIG. 4B shows a case where the characters are spearmen.

That is, in a case where the characters are foot soldiers, as shown in FIG. 4A, the action control unit 252 moves the characters in the frontmost row (front row attributes) forward toward the enemy characters. Then, the characters of the back rows (back row attributes) follow while leaving a certain amount of distance from the characters in front. That is, the action control unit 252 refers to the above-described link information, identifies the front characters, and performs control so that a certain amount of distance is maintained from those characters.

In a case where the characters are spearmen, as shown in FIG. 4B, the action control unit 252 moves the characters in the frontmost row (front row attributes) forward toward the enemy characters while keeping the characters in a single line. That is, the action control unit 252 refers to the above-described link information, refers to the characters on both sides of each character, and moves the characters forward so that no character passes or falls behind a character on either side (so that the speed of forward progress is the same). Then, the characters of the back rows (back row attributes) follow while leaving a certain amount of distance from the characters in front.

In addition, the character control unit 250 appropriately moves the enemy characters as well, based on predetermined logic. Then, the character control unit 250 appropriately updates the character status table to be described later of the character status management unit 250 each time enemy and ally characters are moved.

In a case where the contact assessment unit 270 identifies contact between characters, the position of each target character or the position of one character is minutely moved to a position where contact does not occur.

The CPU 101 can function as such a character control unit 250.

Returning to FIG. 2, the character status management unit 260 manages the status of each character by storing the respective information of each character controlled in the character control unit 250.

For example, the character status management unit 260 stores a character status table such as that shown in FIG. 5, and manages the characters. The character status table includes each character ID, position coordinates, bounding box, HP value, etc. Here, the bounding box in the figure indicates a range (space) occupied by the character. The bounding box is referred to by the contact assessment unit 270 along with character position coordinates for the assessment of contact between characters, as described later. The RAM 103 can function as such a character status management unit 260.

Returning to FIG. 2, the contact assessment unit 270 assesses the presence of contact based on positional relationships between characters.

Specifically, the contact assessment unit 270 compares the respective positional coordinates and bounding boxes of the respective characters in the character status table of the above-described FIG. 5, and sequentially assesses whether or not the characters are in contact (by a so-called "body blow") in the virtual world.

If contact is identified, the contact assessment unit 270 notifies the character control unit 250 of the contact of each target character.

The CPU 101 can function as such a contact assessment unit 270.

The image generating unit 280 generates an image of the landforms and characters arranged in the virtual space.

For example, the image generating unit 280 generates an image indicative of the moving status and battle status of each character based on information stored in the map storage unit 210, the character information storage unit 220, and the character status management unit 260, etc. The image generating unit 280 then displays this image as a game image on a monitor, etc.

The image processor 108 can function as such an image generating unit 280.

(Outline of Operation of Character Control Device)

Figure 6:
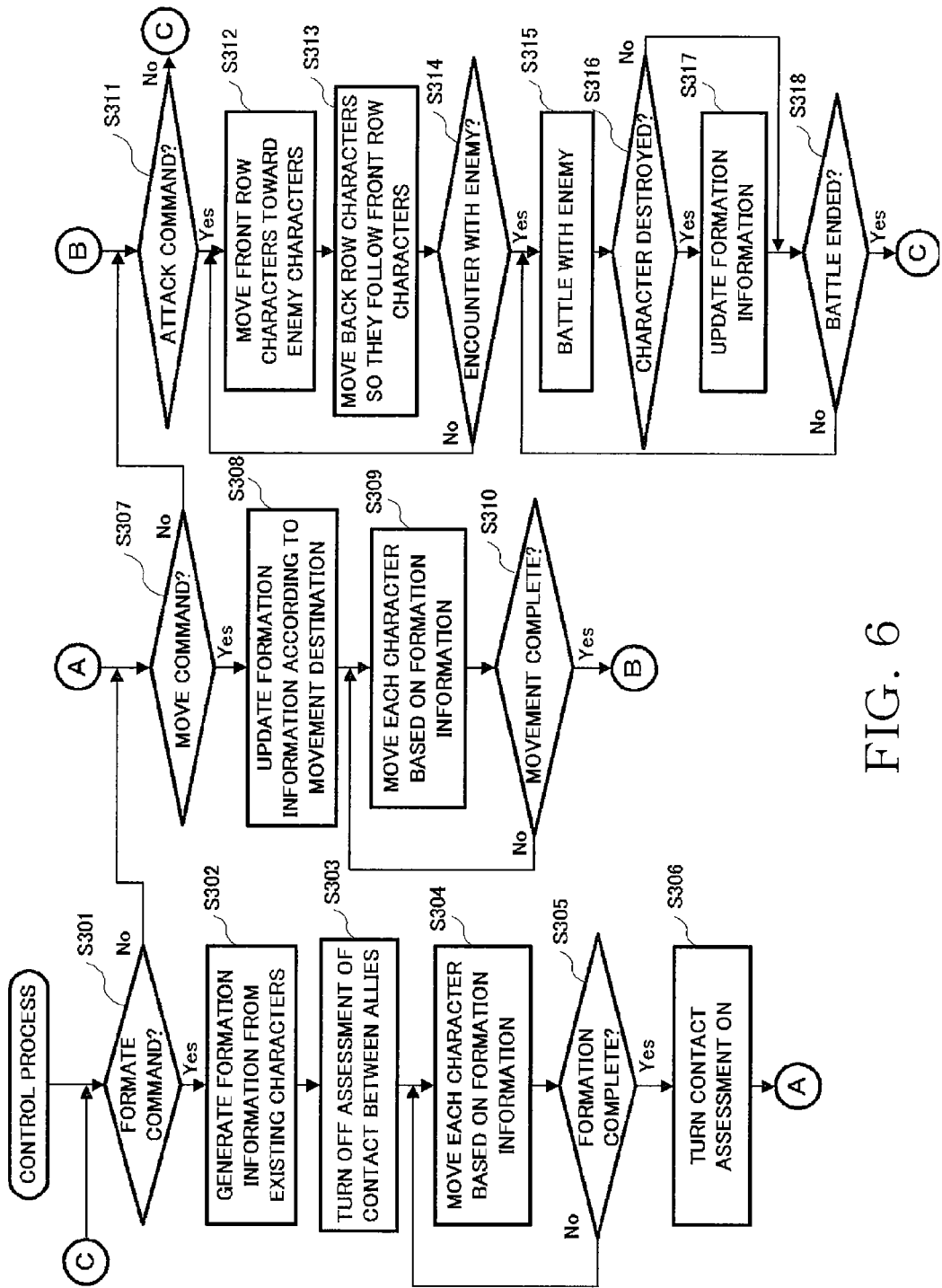
[FIG. 6] A flowchart illustrating the flow of a control process that is executed by the character control device.

FIG. 6 is a flowchart illustrating the flow of a control process that is executed by the character control device 200. A description will be given hereinbelow referring to this diagram. This control process begins when, for example, the action game (realm vs. realm game) starts and the intended operation by the player using the controller 105 becomes possible.

First, when the control process begins, the character control unit 250 assesses whether or not a formate command has been acquired (step S301). That is, the character control unit 250 assesses whether or not a formate command was instructed by a player.

Upon assessment that a formate command has not been acquired (step S301: No), the character control unit 250 proceeds the process to step S307 to be described later.

On the other hand, upon assessment that a formate command has been acquired (step S301: Yes), the character control unit 250 generates formation information from the existing ally characters (step S302).

The character control unit 250 turns off assessment of contact between allies (step S303). That is, the character control unit 250 makes it so the assessment of contact between ally characters by the contact assessment unit 270 is not performed.

The character control unit 250 moves each character based on the formation information (step S304). At this time, because assessment of contact between allies is not performed, each character can quickly get into formation.

The character control unit 250 assesses whether or not formation has been completed (step S305).

Upon assessment that formation has not been completed (step S305: No), the character control unit 250 continues moving the characters in the above step S304.

On the other hand, upon assessment that formation has been completed (step S305: Yes), the character control unit 250 turns contact assessment back on (step S306).

Subsequently, the character control unit 250 assesses whether or not a move command has been acquired (step S307). That is, the character control unit 250 assesses whether or not a move command has been instructed along with a specified predetermined location by a player.

Upon assessment that a move command has not been acquired (step S307: No), the character control unit 250 proceeds the process to step S311 to be described later. On the other hand, upon assessment that a move command has been acquired (step S307: Yes), the character control unit 250 updates formation information according to the move destination (step S308).

The character control unit 250 moves each character based on the formation information (step S309). At this time, each character moves while maintaining the formation.

The character control unit 250 assesses whether or not movement has been completed (step S310).

Upon assessment that movement has not been completed (step S310: No), the character control unit 250 continues moving the characters in the above step S309.

On the other hand, upon assessment that movement has been completed (step S310: Yes), the character control unit 250 proceeds the process to step S311.

Subsequently, the character control unit 250 assesses whether or not an attack command has been acquired (step S311). That is, the character control unit 250 assesses whether or not an attack command along with specified enemy characters has been instructed by a player.

Upon assessment that an attack command has not been acquired (step S311: No), the character control unit 250 returns the process back to the above-described step S301.

On the other hand, upon assessment that an attack command has been acquired (step S311: Yes), the character control unit 250 moves the front row characters toward the enemy characters (step S312).

Further, the character control unit 250 moves the back row characters so that they follow the front row characters (step S313).

Furthermore, the character control unit 250 appropriately moves each character according to attributes as shown in the above-described FIG. 4A and FIG. 4B.

The character control unit 250 assesses whether or not there has been an encounter with enemy characters (step S314).

Upon assessment that there has not been an encounter with enemy characters (step S314: No), the character control unit 250 continues moving the characters in the above steps S312 and S313.

On the other hand, upon assessment that there has been an encounter with enemy characters (step S314: Yes), the character control unit 250 forces the characters into battle with the enemy characters (step S315).

The character control unit 250 assesses whether or not any of the ally characters were destroyed (step S316).

Upon assessment that ally characters have not been destroyed (step S316: No), the character control unit 250 proceeds the process to step S318 to be described later.

On the other hand, upon assessment that ally characters were destroyed (step S316: Yes), the character control unit 250 updates the formation information (step S317). That is, other characters fill the positions of the destroyed characters.

The character control unit 250 assesses whether or not the battle has ended (step S318).

Upon assessment that the battle has not ended (step S318: No), the character control unit 250 returns the process back to step S315 and repeatedly executes the processes of the above steps S315 to S318.

On the other hand, upon assessment that the battle has ended (step S318: Yes), the character control unit 250 returns the process back to the above step S301.

The above-described control process ends when the victory and defeat of enemies and allies have been determined based on predetermined conditions.

When the respective characters are assembled in respective positions within the formation by the above-described control process in this way, assessment of contact between ally characters is turned off and then each character is moved, for example.

This makes it possible for each characters to quickly get into formation. Further, after the formation has been formed, attacks against enemy characters are controlled based on attributes determined according to front row and back row positions while maintaining, under predetermined conditions, the relative positional relationship of the respective characters. As a result, the character group can be moved in an orderly fashion.

(Other Embodiments)

While a case where assessment of contact between ally characters is turned off when the characters are assembled has been described in the above embodiment, the range of the respective bounding boxes that serve as the respective occupied areas of each character may be narrowed so that the characters do not readily contact each other.

While a case where the formation is a line formation of a plurality of rows has been described as one example in the above embodiment, the type of formation is not limited thereto and is arbitrary.

Further, the formation formed may differ according to character type (foot soldier or spear man).

The present invention claims priority based on Japanese Patent Application No. 2005-097512, the entire contents of which are incorporated herein by reference.

INDUSTRIAL APPLICABILITY

As explained above, according to the present invention, it is possible to provide a character control device, character control method, recording medium and program suitable for moving a character group in an orderly fashion.

The invention claimed is:

1. A character control device comprising:
    a character storage unit that stores character information of a plurality of characters arranged in a virtual space, the character information including a current position and regulated occupied areas for each of the plurality of characters;
    a formation storage unit that stores formation information regulating a formation to be formed by each of the plurality of characters, the formation information including a position in the formation assigned to each of the plurality of characters;
    a contact assessment unit for assessing a contact between the plurality of characters by comparing the current position and the regulated occupied areas of each of the plurality of characters;
    a character control unit that determines a sequential movement for each of the plurality of characters based on the contact assessment; and
    an image generation unit that sequentially generates images of each of the plurality of characters moving, wherein
    the character control unit further comprises an assembling control unit that, based on the formation information, nullifies an effect of the contact assessment between the plurality of characters while each of the plurality of characters are being assembled from a scattered position to the position in the formation, and
    the image generation unit sequentially generating images of each of the plurality of characters being assembled while the effect of the contact assessment is being nullified.

2. The character control device according to claim 1, wherein:
    the character control unit further comprises an action control unit that sets the effect of the contact assessment of the contact assessment unit effective, keeps under a predetermined condition a relative positional relationship of the plurality of characters that form the formation, and determines a movement of a character of a front row attribute within the formation, and causes a character of a back row attribute to follow the character of the front row attribute,
    the formation storage unit stores attribute information corresponding to each of a plurality of rows within the formation, and link information that regulates a positional relationship of the each of the plurality of rows within the formation, and
    the action control unit controls the movement of each of the plurality of characters of the front row attribute, and makes each of the plurality of the characters of the back row attribute follow the corresponding character of the front row while maintaining a certain amount of space therebetween based on the link information.

3. The character control device according to claim 1, wherein:
    in a case where a character of the formation is destroyed based on predetermined conditions, the character control unit updates the formation information and assigns to another character a position within the formation of the destroyed character.

4. A character control method that uses a character storage unit and formation storage unit, wherein
    the character storage unit stores character information of a plurality of characters arranged in a virtual space, the character information including a current position and regulated occupied areas for each of the plurality of characters; and
    the formation storage unit stores formation information regulating a formation to be formed by each of the plurality of characters, the formation information including a position in the formation assigned to each of the plurality of characters, the character control method comprising:
    a contact assessment step for assessing a contact between the plurality of characters by comparing the current position and the regulated occupied areas of each of the plurality of characters;
    a character control step for determining a sequential movement for each of the plurality of characters based on the contact assessment; and
    an image generation step for sequentially generating images of each of the plurality of characters moving, wherein
    the character control step further comprises an assembling control step that, based on the formation information, nullifies an effect of the contact assessment between the plurality of characters while each of the plurality of characters are being assembled from a scattered position to the position in the formation, and
    the image generation step including the step of sequentially generating images of each of the plurality of characters being assembled while the effect of the contact assessment is being nullified.

5. A non-transitory recording medium that has recorded a program for controlling a computer to function as:
    a character storage unit that stores character information of a plurality of characters arranged in a virtual space, the character information including a current position and regulated occupied areas for each of the plurality of characters;

a formation storage unit that stores formation information regulating a formation to be formed by each of the plurality of characters, the formation information including a position in the formation assigned to each of the plurality of characters;

a contact assessment unit for assessing a contact between the plurality of characters by comparing the current position and the regulated occupied areas of each of the plurality of characters;

a character control unit that determines a sequential movement for each of the plurality of characters based on the contact assessment; and an image generation unit that sequentially generates images of each of the plurality of characters moving, wherein the character control unit further comprises an assembling control unit that, based on the formation information, nullifies an effect of the contact assessment between the plurality of characters while each of the plurality of characters are being assembled from a scattered position to the position in the formation, and the image generation unit sequentially generating images of each of the plurality of characters being assembled while the effect of the contact assessment is being nullified.

6. A character control device comprising:

a character storage unit that stores character information of a plurality of characters arranged in a virtual space and classified as enemies or allies, the character information including a current position and regulated occupied areas for each of the plurality of characters;

a formation storage unit that stores formation information regulating at least a formation to be formed by ally characters, the formation information including a position in the formation assigned to each of the ally characters;

a contact assessment unit for assessing a contact between the plurality of characters by comparing the current position and the regulated occupied areas of each of the plurality of characters;

a character control unit that determines a sequential movement for each of the plurality of characters based on the contact assessment; and an image generation unit that sequentially generates images of each of the plurality of characters moving, wherein the character control unit further comprises an assembling control unit that, based on the formation information, nullifies an effect of the contact assessment between the plurality of ally characters while each of the ally characters are being assembled from a scattered position to the position in the formation, and the image generation unit sequentially generating images of each of the plurality of ally characters being assembled while the effect of the contact assessment is being nullified.

\* \* \* \* \*